US010092897B2

(12) United States Patent
Xu et al.

(10) Patent No.: US 10,092,897 B2
(45) Date of Patent: Oct. 9, 2018

(54) CATALYST TRAP

(71) Applicant: FORD GLOBAL TECHNOLOGIES, LLC, Dearborn, MI (US)

(72) Inventors: Lifeng Xu, Northville, MI (US); Giovanni Cavataio, Dearborn, MI (US); Gang Guo, Ann Arbor, MI (US); Jeffrey Scott Hepburn, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 203 days.

(21) Appl. No.: 15/133,332

(22) Filed: Apr. 20, 2016

(65) Prior Publication Data

US 2017/0304811 A1    Oct. 26, 2017

(51) Int. Cl.

| | |
|---|---|
| *B01J 29/06* | (2006.01) |
| *B01J 29/80* | (2006.01) |
| *B01J 35/00* | (2006.01) |
| *B01J 37/02* | (2006.01) |
| *B01D 53/92* | (2006.01) |
| *B01D 53/94* | (2006.01) |
| *B01J 20/18* | (2006.01) |
| *B01J 29/12* | (2006.01) |
| *B01J 29/14* | (2006.01) |
| *B01J 29/74* | (2006.01) |
| *B01J 29/76* | (2006.01) |

(52) U.S. Cl.
CPC ............ *B01J 29/80* (2013.01); *B01D 53/922* (2013.01); *B01D 53/925* (2013.01); *B01D 53/9459* (2013.01); *B01D 53/9486* (2013.01); *B01J 20/18* (2013.01); *B01J 35/0006* (2013.01); *B01J 37/02* (2013.01); *B01D 2253/10* (2013.01); *B01D 2253/25* (2013.01); *B01J 29/126* (2013.01); *B01J 29/146* (2013.01); *B01J 29/7415* (2013.01); *B01J 29/7615* (2013.01); *Y02T 10/22* (2013.01)

(58) Field of Classification Search
CPC . B01J 20/18; B01J 29/80; B01J 29/146; B01J 29/126; B01J 29/7415; B01J 29/7615; B01J 35/0006; B01J 37/02; B01D 53/922; B01D 53/925; B01D 53/9459; B01D 53/9486; B01D 2255/9022; B01D 2253/10; B01D 2253/25
USPC ......... 502/64, 67, 69, 74, 79, 407, 414, 526; 422/168, 177

See application file for complete search history.

(56) References Cited

U.S. PATENT DOCUMENTS

| | | | | |
|---|---|---|---|---|
| 5,603,216 | A | * | 2/1997 | Guile .................... F01N 3/0814 60/288 |
| 5,744,103 | A | * | 4/1998 | Yamada ............. B01D 53/9481 422/171 |
| 6,074,973 | A | * | 6/2000 | Lampert ............... B01D 53/945 423/213.2 |
| 8,926,910 | B2 | * | 1/2015 | Lupescu ............... F01N 3/0807 422/177 |
| 9,140,167 | B2 | * | 9/2015 | Bergeal .................... B01J 23/96 |
| 2011/0305614 | A1 | * | 12/2011 | Stiebels ............. B01D 53/9418 423/213.5 |
| 2012/0275977 | A1 | * | 11/2012 | Chandler ........... B01D 53/9418 423/213.5 |
| 2013/0340414 | A1 | * | 12/2013 | Bergeal .................... B01J 23/96 60/299 |

FOREIGN PATENT DOCUMENTS

| | | | |
|---|---|---|---|
| EP | 1 301 264 | * | 1/2005 |
| WO | WO 2008/132452 | * | 11/2008 |
| WO | 2015/049110 A1 | | 4/2015 |

OTHER PUBLICATIONS

Abatement of Hydrocarbons by acid ZSM-5 and BETA zeolites under cold-start conditions, Apr. 2013, vol. 19, Issue 2, pp. 357-365; http://link.springer.com/article/10.1007%2Fs10450-012-0458-3, first online Jan. 11, 2013.

* cited by examiner

*Primary Examiner* — Elizabeth D Wood
(74) *Attorney, Agent, or Firm* — Brooks Kushman P.C.

(57) ABSTRACT

A catalytic converter includes a hydrocarbon catalyst trap including BEA zeolite configured to adsorb iso-octane at ambient temperatures and desorb iso-octane at temperatures between 150° C. and 170° C., and active metal supercage impregnated USY zeolite configured to adsorb and coke iso-octane at temperatures greater than 150° C.

18 Claims, 7 Drawing Sheets

CATALYST TRAP

TECHNICAL FIELD

The disclosure relates to an automotive catalyst trap designed to reduce cold start emissions and a method of producing the same.

BACKGROUND

Reduction of tailpipe emissions is a challenging goal in the automotive industry. As the acceptable values for tailpipe emissions continue to decrease, technologies must continually improve to meet the standards. Many efforts have been focused on reduction of hydrocarbon (HC) cold start emissions or emissions produced during the first several minutes after a vehicle is started. The traditional approaches to reducing cold start HC emissions include development of catalysts capable of warming up quickly and lighting-off at lower temperatures as well as optimizing engine cold start conditions to deliver heat to the catalyst as quickly as possible. However, even with very fast catalyst light-off, there are generally at least tens of seconds during cold start when the catalyst is not warm enough to convert any HC species. As a result, tailpipe emissions include unconverted HC species.

SUMMARY

In at least one embodiment, a catalytic converter is disclosed. The catalytic converter includes a hydrocarbon catalyst trap. The hydrocarbon catalyst trap includes BEA zeolite configured to adsorb iso-octane at ambient temperatures and desorb iso-octane at temperatures between 150° C. and 170° C. The hydrocarbon catalyst trap further includes active metal supercage impregnated USY zeolite configured to adsorb and coke iso-octane at temperatures greater than 150° C. The active metal may be palladium. The BEA zeolite and the active metal supercage impregnated USY zeolite may form respective adjacent layers. The BEA zeolite may be disposed between a three-way catalyst and the active metal supercage impregnated USY zeolite. The active metal supercage impregnated USY zeolite may be disposed between a three-way catalyst and the BEA zeolite. The BEA zeolite and the active metal supercage impregnated USY zeolite may form a mixture. The ratio of the BEA zeolite to the active metal supercage impregnated USY zeolite may be in a range of 1:4 to 4:1. The ratio of silica to alumina of the BEA zeolite may be 15 to at least 250. The USY zeolite may be USY 5 to USY 45. At least a portion of the BEA zeolite may be palladium supercage impregnated BEA zeolite or copper supercage impregnated BEA zeolite.

In another embodiment, a catalytic trap is disclosed. The catalytic trap may include BEA zeolite configured to adsorb iso-octane at ambient temperatures and desorb iso-octane at temperatures between 150° C. and 170° C. The catalytic trap may further include precious metal supercage impregnated USY zeolite in contact with the BEA zeolite, and configured to adsorb and coke iso-octane at temperatures greater than 150° C. The catalytic trap may additionally include active metal supercage impregnated BEA zeolite disposed upstream of the BEA zeolite and configured to adsorb toluene at ambient temperatures. The precious metal may be palladium. The active metal may be copper. The BEA zeolite, the precious metal supercage impregnated USY zeolite, and the active metal supercage impregnated BEA zeolite may form respective adjacent layers. The active metal supercage impregnated BEA zeolite may form a layer oriented perpendicular to the BEA zeolite and precious metal supercage impregnated USY zeolite layers.

In yet another embodiment, a hydrocarbon and NOx catalyst trap is disclosed. The hydrocarbon and NOx catalyst trap may include a three-way catalyst including less than 20 g/ft$^3$ of palladium. The trap may further include BEA zeolite configured to adsorb iso-octane at ambient temperatures and desorb iso-octane at temperatures between 150° C. and 170° C. The trap may additionally include precious metal supercage impregnated USY zeolite in contact with the BEA zeolite, and configured to adsorb and coke iso-octane at temperatures greater than 150° C. The trap may also include active metal supercage impregnated BEA zeolite disposed upstream of the BEA zeolite and configured to adsorb toluene at ambient temperatures. The precious metal may be palladium. The active metal may be copper. The ratio of the BEA zeolite to the precious metal supercage impregnated USY zeolite may be in a range of 1:4 to 4:1. The USY zeolite may be USY 5 to USY 45.

DETAILED DESCRIPTION

Figure 1:
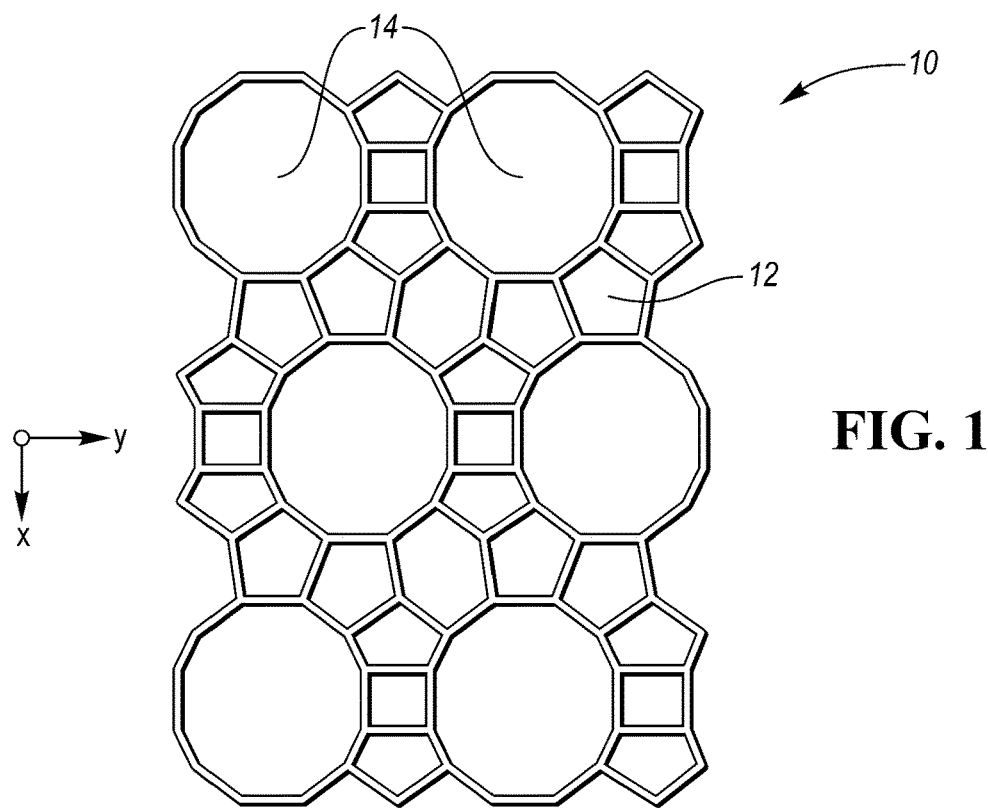
FIG. 1 depicts a projection of a portion of BEA zeolite framework structure.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Reference is being made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

As the demand for environmentally-conscious technologies grows, regulations regarding the automotive emissions are becoming increasingly more stringent. An example classification for passenger vehicle emissions is Super Ultra-Low Emission Vehicle SULEV20 and SULEV30. The SULEV classification is based on producing 90% less emissions than an equivalent gasoline-powered vehicle. The SULEV vehicles are thus 90% cleaner than the average new vehicle for the model year. To comply with the SULEV and similar classifications, various strategies have been implemented. For example, since the cold start HC emission remains a challenge, focusing on reduction of the cold start emissions may increase overall reduction of tailpipe emissions. Cold start emissions relate to the emissions of gasoline and diesel passenger vehicles which are not reduced by catalysts during a warm-up phase of the vehicle. Catalysts require a certain temperature, typically above 300° C., to work efficiently. Before the engine reaches the temperature sufficient to warm the catalyst after a vehicle is started, emissions are not being reduced and thus represent a significant portion of overall tailpipe emissions. The duration of the cold start period and the overall emissions produced during this phase depend on the ambient temperature, the type of fuel used, the initial temperature of the vehicle's propulsion system, and other factors.

A traditional approach to reducing the cold start HC emissions includes development of catalysts capable of warming up quickly and lighting-off at relatively low temperatures as well as optimizing the engine cold start condition to heat up the catalysts fast. However, a time window of about 20 to 40 seconds at the beginning of the cold start remains. During this window, the catalyst is not hot enough to convert the HC species. As a result, about 95% of tailpipe non-methane hydrocarbon (NMHC) emissions of a current vehicle in FPT75 emission test cycle releases during the cold start. This places a higher demand on an overall reduction of the total tailpipe NMHC emissions for a vehicle which is to meet particular emissions standards.

One of the alternative approaches to reducing cold start HC emissions is the application of a HC trap catalyst. The main idea behind a HC trap is adsorbing HCs during cold start, when the catalyst is cold and not active, and releasing and converting the trapped HC when the catalyst warms up after the cold start period ends. The effectiveness of the HC trap in reducing cold start NMHC emissions depends on the trap's capacity to store HCs at cold start and on the release temperatures of the trapped HCs. The more HCs the trap can adsorb during cold start and the higher the release temperature, the more cold start HCs can be converted by the HC trap catalyst. A typical HC trap can convert up to about 30 to 40% of the cold start NMHC. Thus, it would be desirable to identify ways how to convert more than 40% of the cold-start NMHC to meet more stringent emission standards.

A typical HC trap catalyst includes two main components: HC trapping material and a three-way catalyst (TWC). Various HC trapping materials have been identified. Zeolites have proven to be very useful and effective trapping components of a HC trap. The type of zeolites, and the way they are modified, significantly impacts their HC trapping efficiency, HC release temperature, and overall HC catalyst trap conversion efficiency.

Zeolites are microporous aluminosilicate minerals including interlinked tetrahedral of alumina ($AlO_4$) and silica ($SiO_4$). Zeolites occur naturally, but are also produced industrially. Examples of the naturally-occurring zeolites include analcime, chabazite, clinoptilolite, heulandine, natrolite, stilbite, etc. Industrial preparation of zeolites allows for creation of precise and unique frameworks of zeolites. Tailoring of the synthetic zeolites, for example designing the pore size, thus provides several advantages over their naturally-occurring analogs.

As can be seen in FIG. 1, zeolites have a very regular porous crystalline three-dimensional framework structure 10 of molecular dimensions. The basic zeolite framework 10 is built from aluminum, oxygen, and silicon. The pore 12 structure is capable of accommodating a wide variety of cations such as alkaline-Earth metals (sodium, potassium, magnesium), which may be trapped within the pores 12, and which may be exchanged for other cations via ion-exchange. Zeolites are also called "molecular sieves," referring to their ability to selectively sort molecules based primarily on size exclusion. The framework 10 of a zeolite forms a number of channels 14 extending throughout the framework structure 10. The dimensions and orientation of the channels 14 determines the maximum size of a molecular or ionic species that can enter the pores 12 of the zeolite. The shape, size, and composition of the zeolite thus determine its properties including an ability to capture certain species of HCs.

Therefore, the type of the trapping zeolite material determines the HC species the trap is capable of capturing and holding. Certain cold-start HCs may not be trapped by every trapping material. For example, certain HC species may have dimensions exceeding the maximum size of the channels 14 and may not be able to enter the zeolite channels 14. Alternatively, the orientation of the zeolite channels 14 may not be conducive to allow entry of certain HC species. These HC species may thus have almost zero trapping function and conversion.

Depending on the type of fuel used by the engine, speciation of the HCs differs. For example, HC profiles of E10 (Ethanol 10%) and E85 (Ethanol 85%) are significantly different. The cold-start HC profile for E10 includes iso-pentane, toluene, ethylene, and propylene, among other species. The HC profile for E85, on the other hand, includes ethanol, ethylene, iso-pentane, and acetaldehyde, as main contributors. The trapping material thus should be tailored to enable trapping of the relevant species of the fuel to be used by the engine. Yet, other HC species present in the fuel may not be trapped by the current HC catalyst traps and have almost zero conversion. Among such difficult HCs to capture is iso-octane (2,2,4-Trimethylpentane). Iso-octane counts for about 12% to 14% of total cold start NMHC emissions in E10. To trap this difficult-to-trap HC, a HC trapping material should be precisely chosen and modified.

Figure 2:
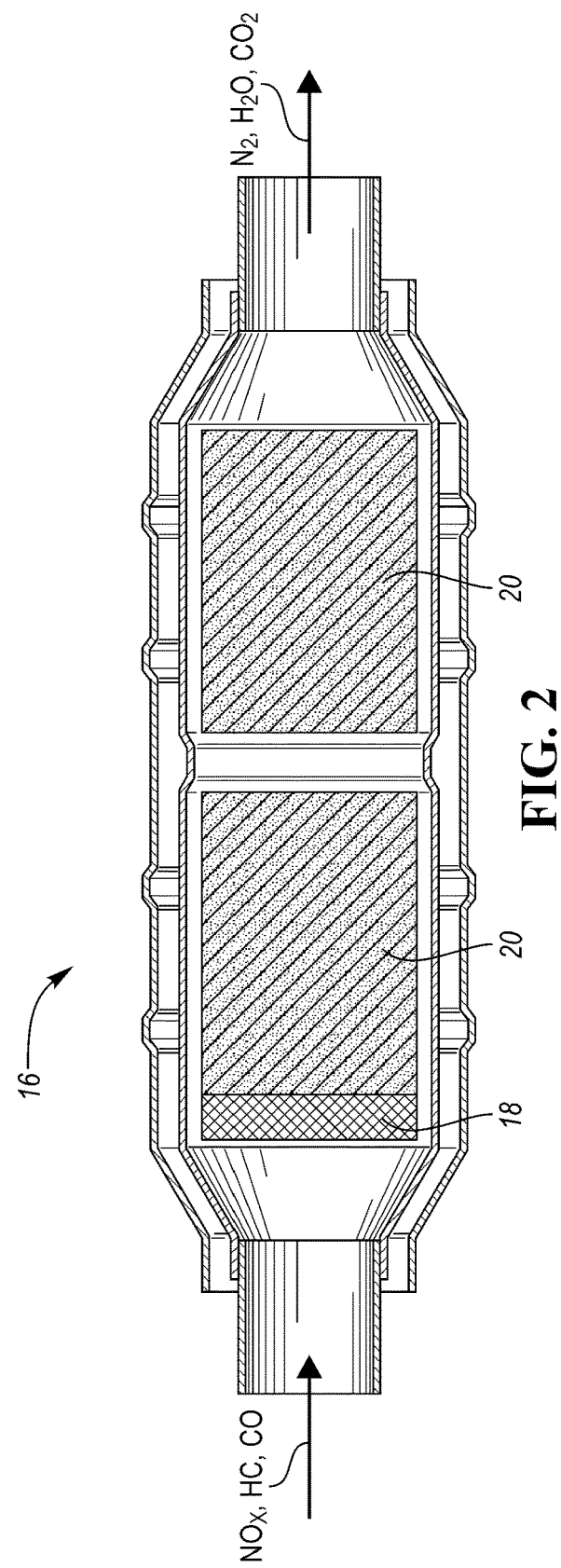
FIG. 2 shows a schematic view of a catalytic converter according to one or more embodiments.

In one or more embodiments of the current disclosure, a catalytic converter 16 is disclosed which is capable of trapping and converting iso-octane. The catalytic converter 16, which is schematically depicted in FIG. 2, includes a HC catalyst trap 18 including a combination of zeolites of different types located downstream from the TWC 20 containing a reduction catalyst designed to eliminate NOx and an oxidation catalyst to eliminate CO and unburned HCs. The TWC 20 includes catalytic active material such as alumina oxide $Al_2O_3$, cerum oxide $CeO_2$, rare earth stabilizers, precious metals such as Pt, Pd, Rh, the like, or a combination thereof. The catalytic converter 16 and the dimensions and orientation of the depicted layers 18, 20 is just schematic to illustrate the main direction of the exhaust gas flow.

The HC catalyst trap 18 utilizes more than one type of zeolites. Specifically, the HC trap 18 includes a Beta polymorph A (BEA) zeolite, which is depicted in FIG. 1. The BEA zeolite is configured to adsorb iso-octane at ambient temperatures and desorb iso-octane at temperatures between 150° C. and 170° C. The BEA zeolite has the following characteristics. The largest cavity diameter is 6.9 Å; the pore limiting diameter is 6.7 Å. Cell parameters of the BEA framework are as follows: a=12.632 Å, b=12.632 Å, c=26.186 Å. This translates into the maximum diameter of a molecule that can be trapped by BEA to 6.68 Å and that can diffuse along a, b, and c to 5.95 Å. The framework density is 15.3 T/1000 Å$^3$. Accessible and occupiable volume of the BEA framework is about 20.52%, which translates into 857.32 Å$^3$. The occupiable volume means the portion of the available volume within the cell that can be visited by the center of a spherical water molecule having a radius of about 1.4 Å. The available volume is the unit cell volume remaining after the van der Waals atomic sphere volumes are subtracted. The accessible volume relates to the portion of the occupiable volume that has continuity between all unit cells. Some pores have openings that are too small to allow the water molecule access and so represent isolated occupiable regions. The occupiable area or an area of the surface visited by the center of the water molecule is 779.37 Å$^2$ or 1220.55 m$^2$/g. The composite building units of the BEA framework are mor (t-tes), bea, and mtw (t-mtw). The Periodic Building Unit in the tetragonal BEA includes T16 units: 4 fused 6-rings or 8 fused 5-rings relates by pure translations along the cell edges a and b.

The BEA zeolite may be BEA 15 to 50, 30 to 150, or 40 to 250. The numerical designation after the structural code relates to silica to alumina ratio (SAR). In an alternative embodiment, the SAR of the BEA zeolite may be at least 250, at least 300, at least 400, or up to 1000. The higher the SAR, the more stable but less active the zeolite is. In certain embodiments discussed below, high SAR is desirable.

The BEA zeolite may be modified with a transition metal or precious metal, hereinafter referred to as an active metal. The modification with the active metal is provided to improve HC adsorption and desorption performance. Different active metals provide different results and may improve adsorption and desorption of only certain HC species. In other words, the type of zeolite and active metal used to modify the zeolite determine trapping ability for certain HC species. For example, when copper is added to a zeolite material, adsorption of propylene may be enhanced and the adsorbed propylene may be released at higher temperatures than from a non-modified zeolite.

Figure 3:
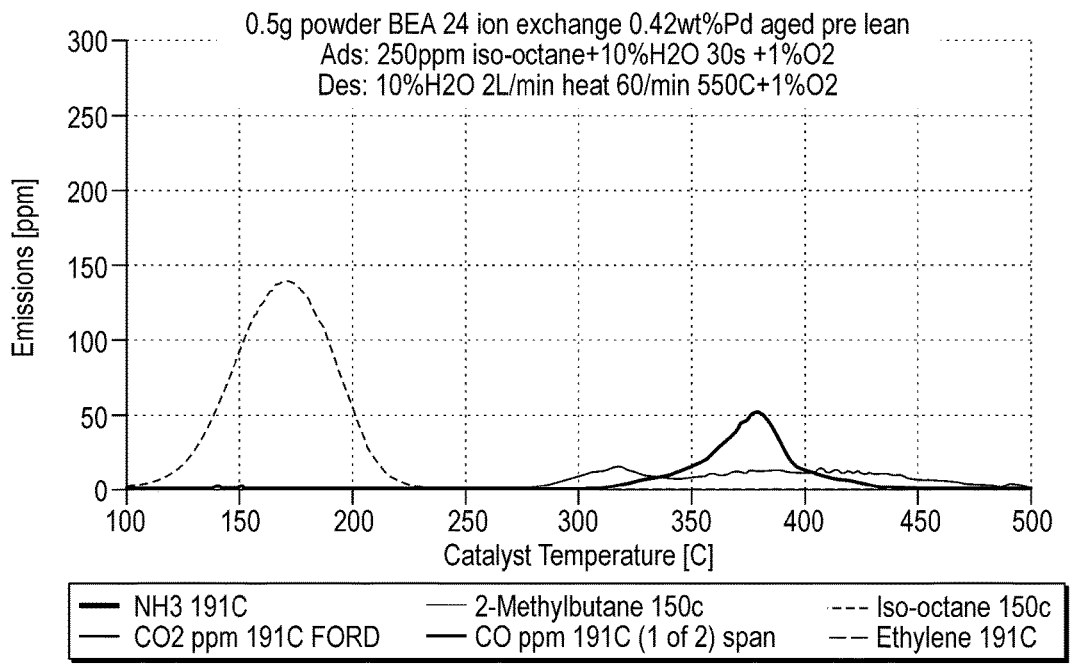
FIG. 3 depicts a plot of iso-octane concentration versus catalyst temperature iso-octane desorption at BEA24 zeolite with 0.5 wt. % Pd loading.

It has been unexpectedly found that the BEA zeolite modified with an active metal is capable of an improved adsorption of iso-octane at ambient temperatures and desorption of ico-octane at 150° C. to 170° C. when compared to non-modified BEA zeolite. The active metals may be transition and precious metals such as Pd, Pt, Cu, Ni, Fe, Mn, or the like. Good results have been achieved with palladium-modified BEA and copper-modified BEA. The active metal may be inserted within the supercage of the zeolite. The amount of the active metal included may be from about 0.05 to 3.5 wt. %, from 0.1 to 2 wt. %, or from 0.5 to 1 wt. %. FIG. 3 illustrates concentration versus catalyst temperature of iso-octane desorption at BEA24 with 0.5 wt. % palladium loading. The peak desorption temperature is about 170° C. and most of the iso-octane releases as iso-octane with only about 5% conversion to CO and $CO_2$. Thus, BEA zeolite by itself releases iso-octane at temperatures which are below the TWC light-off temperature which is about 280° C. to 300° C.

Figure 4:
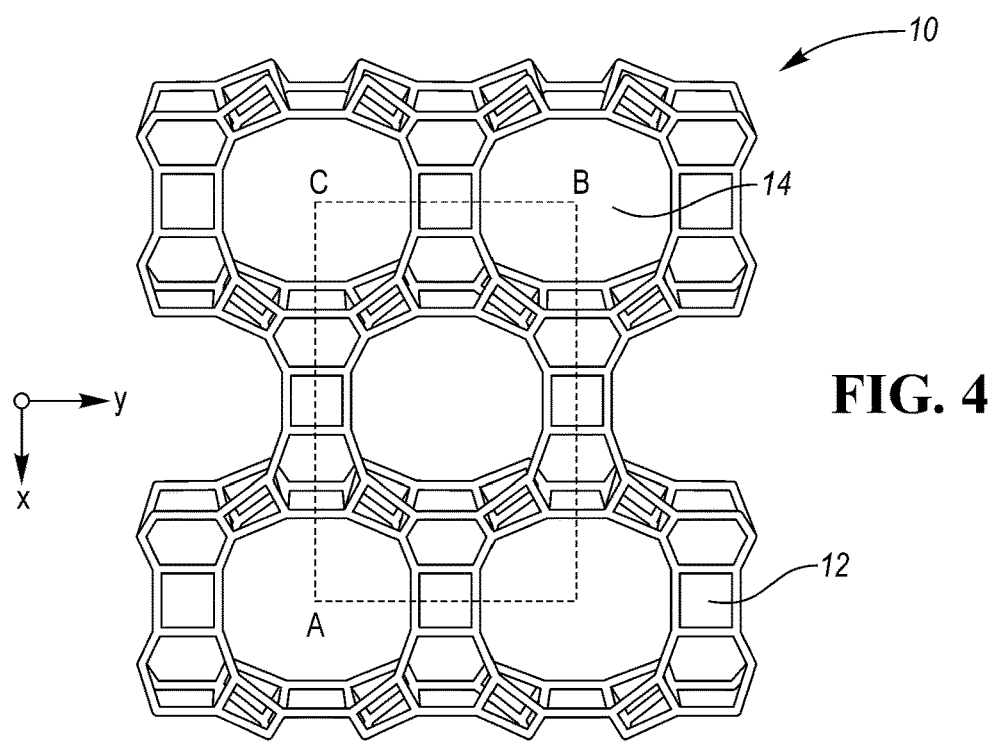
FIG. 4 depicts a projection view of a portion of a USY zeolite framework structure.

To increase the efficiency of the HC trap 18, the BEA zeolite is combined with another type of zeolite. The second type of zeolite framework 10 to be included in the HC trap 18 may be ultra-stable-y (USY) zeolite depicted in FIG. 4. The USY zeolite may be USY 5 to USY 45 or USY 10 to USY 30.

The USY zeolite has the following characteristics. The largest cavity diameter is 6.9 Å; the pore limiting diameter is 6.7 Å. Cell parameters of the USY framework are as follows: a=21.119 Å, b=12.971 Å, c=9.672 Å. This translates into the maximum diameter of a molecule that can be trapped to 6.76 Å and that can diffuse along a: 1.73 Å, along b: 4.04 Å, and along C: 6.28 Å. The framework density is 15.9 T/1000 Å$^3$. Accessible and occupiable volume of the USY framework is about 17.47%, which translates into 857.32 Å$^3$. The occupiable area or an area of the surface visited by the center of the water molecule is 499.74 Å$^2$ or 1252.2 m$^2$/g. The composite building units of the USY framework are dzc, mei, and bog. The Periodic Building Unit in the USY framework includes T10 units having doubly (1,3)-connected double 4-rings with T2-diomers or two 4-1 units.

Just like the BEA zeolite, the USY zeolite may be modified with an active metal to improve HC adsorption and desorption performance. Different active metals provide different results and may improve adsorption and desorption of only certain HC species. The active metal to modify USY may be a precious metal or a transition metal such as Pd, Pt, Cu, Ni, Fe, Mn, or the like. The active metal may be inserted within the supercage to produce an active metal supercage impregnated USY zeolite. Good results have been achieved with palladium-modified USY zeolite. The amount of active metal included may be from about 0.05 to 3.5 wt. %, from 0.1 to 2 wt. %, or from 0.5 to 1 wt. %.

It is desirable that the active metals in both BEA and USY zeolites attach within their supercage structures so that the active metals are in contact with acid sites located on the inside of the supercages. The active metal of choice thus should have dimensions to fit within the supercage. Alternatively, attachment on the outside of the supercage is also possible.

Figure 5:
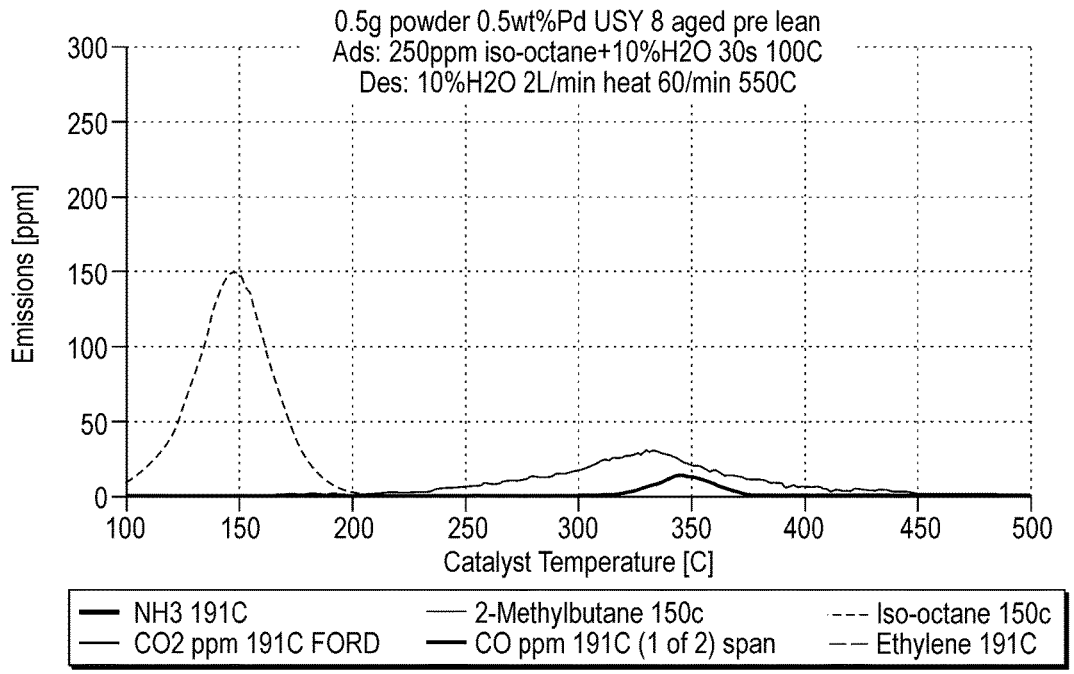
FIG. 5 shows a plot of iso-octane concentration versus catalyst temperature iso-octane desorption at USY8 zeolite with 0.5 wt. % Pd loading.
Figure 6:
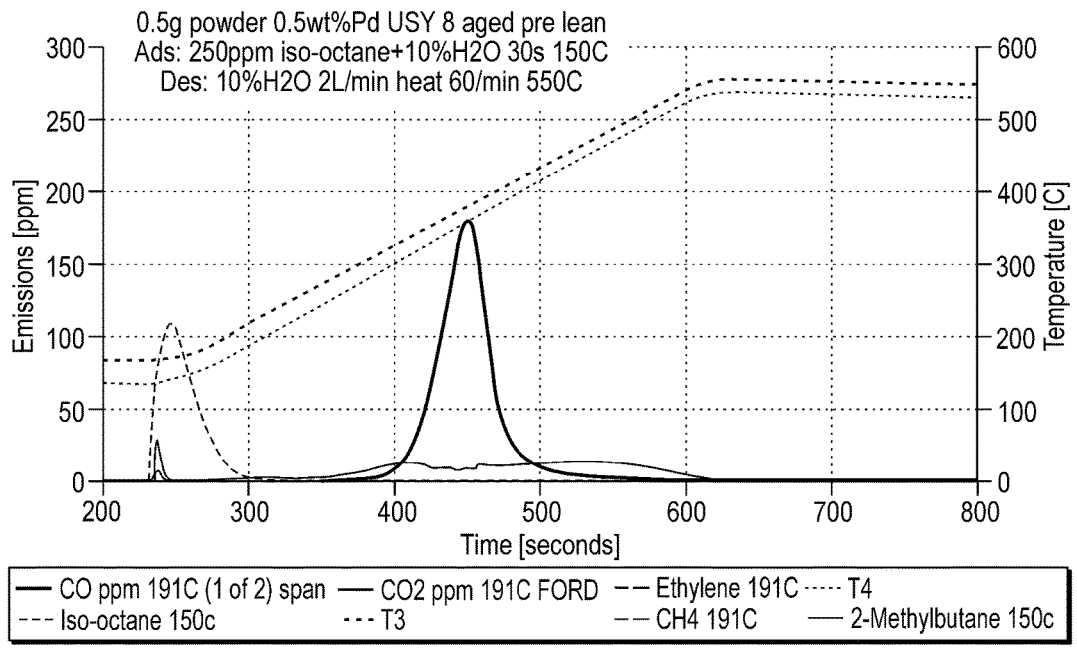
FIG. 6 depicts a plot of iso-octane concentration versus time of iso-octane desorption at USY8 with 0.5 wt. % Pd loading with the initial iso-octane adsorption temperature of 150° C.
Figure 7:
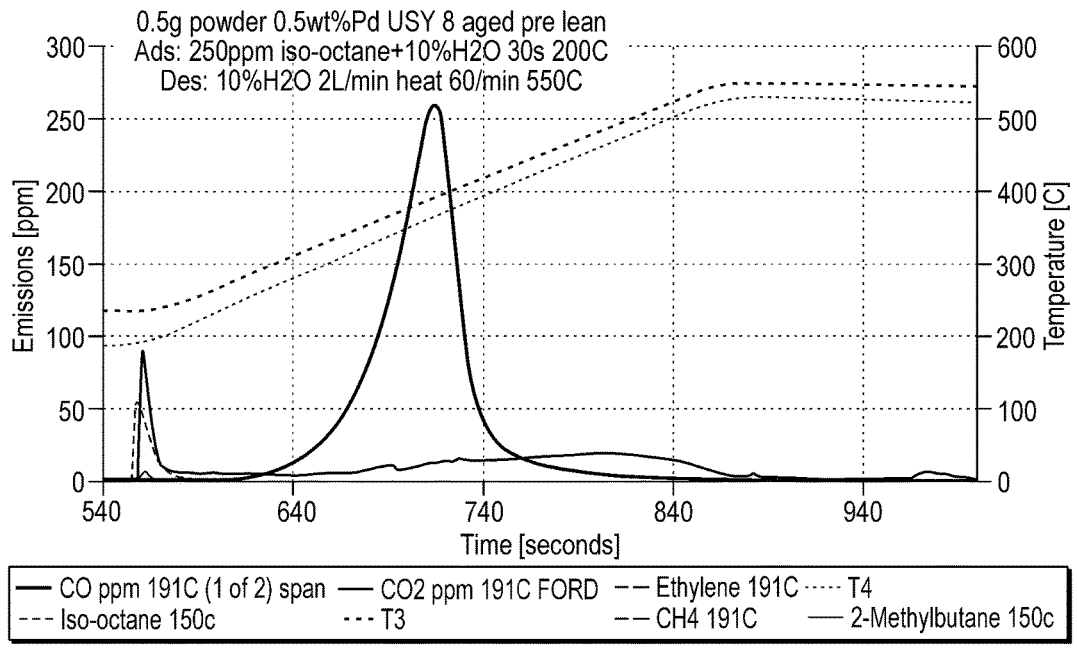
FIG. 7 depicts a plot of iso-octane concentration versus time of iso-octane desorption at USY8 with 0.5 wt. % Pd loading with the initial iso-octane adsorption temperature of 200° C.
Figure 8:
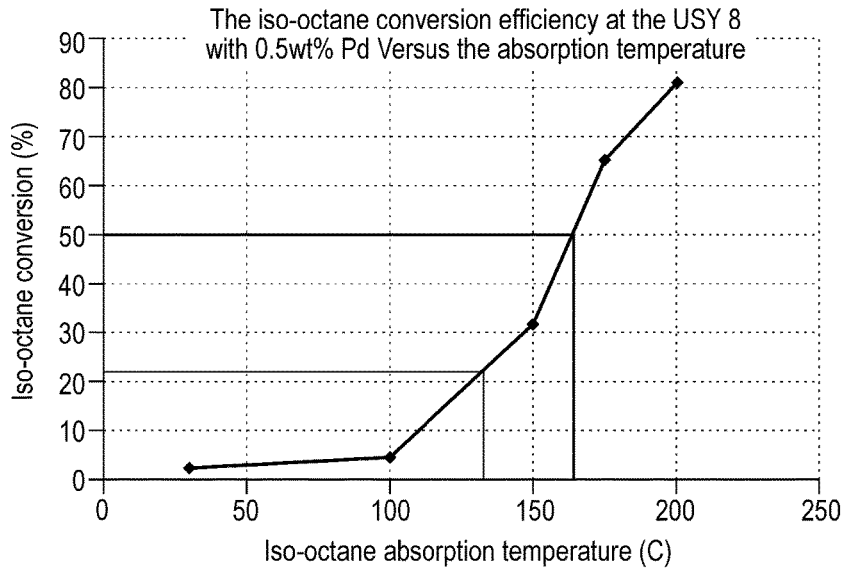
FIG. 8 shows iso-octane conversion efficiency at USY8 with 0.5 wt. % Pd loading versus iso-octane adsorption temperature.

FIG. 5 depicts a plot of iso-octane concentration versus catalyst temperature of iso-octane desorption at USY8 with 0.5 wt. % Pd loading. In FIG. 5, the adsorption of iso-octane was studied at room temperature and desorption during heating of the sample. The peak desorption temperature reached was about 145° C. Less than 10% of iso-octane was converted to CO and $CO_2$. FIGS. 6 and 7 depict pots of the concentration versus time of iso-octane desorption at USY8 with 0.5 wt. % Pd loading during desorption when the sample was heated at a rate of 60° C./minute. The initial iso-octane adsorption temperature was about 150° C. in FIG. 6 and about 200° C. in FIG. 7. About 30%, and 80% respectively, of iso-octane was converted to CO and $CO_2$. A plot of iso-octane conversion efficiency versus adsorption temperature is depicted in FIG. 8. FIGS. 5-8 thus illustrate that the efficiency of iso-octane conversion at USY8 loaded with 0.5 wt. % Pd increases significantly when temperature increases above 150° C. Thus the USY zeolite is a more efficient iso-octane trap at higher temperatures.

Unlike BEA or USY zeolites alone, the combination of the BEA zeolite modified with an active metal and the USY zeolite modified with an active metal incorporated into the same HC catalyst trap 18 provide beneficial results. BEA is capable of capturing iso-octane at lower temperatures, specifically at ambient or room temperature of about 20° C. to 25° C., and releasing iso-octane at the temperature at which USY is capable of readsorbing iso-octane. Thus, BEA zeolite may first capture the incoming iso-octane and hold it until a temperature of about 150° C. to 170° C. is reached. At that point, the USY zeolite adsorbs the released iso-octane and holds it further so that the BEA-release iso-octane does not leave the catalytic converter 16 in its unconverted form. Furthermore, the USY zeolite is capable of coking the trapped iso-octane without releasing iso-octane. The formed coke may be oxidized at higher temperatures than 150° C. The system thus allows holding of the iso-octane for an extended period of time and releasing it at higher temperatures compared to a HC trap which does not contain BEA, USY combination of zeolites.

Coke formation over USY zeolites is known and a decrease in USY catalytic activity is usually attributed to the coke formation. The coke may form inside of the USY pores 12, outside of the USY pores 12, or both. Yet typically, catalytic cracking and resulting formation of coke over USY is presented as a problem because as coke forms, USY's catalytic activity decreases. But presently, it was surprisingly discovered that the coking assists in trapping of the iso-octane for a longer period of time compared to a zeolite without the ability to coke iso-octane. Without relying on a single theory, it is believed that the formed coke physically blocks the iso-octane molecules from being released from the USY pores 12 once trapped. Thanks to the coking, iso-octane is being trapped within modified USY for an extended period of time during which the catalytic converter's temperature increases to a temperature which is sufficiently high to convert at least some iso-octane.

The SAR of the BEA and/or USY zeolite influences the amount of the active metal which will ion-exchange with alumina in the zeolite supercage. For example, high silica level (such as the SAR of more than 250) in the BEA zeolite framework 10 may result in a lack of sites available for ion-exchange in BEA. Thus, the active metal will gravitate towards USY, ion-exchange primarily with USY, and have minimal ion-exchange with BEA. The SAR of the USY zeolite should be chosen to enable this process. The SAR of the USY zeolite may be 4 to 45. Directing majority of the transition metal to ion-exchange with USY is desirable as USY is capable of coking trapped iso-octane, and the transition metal assists with the coking process in USY. Choosing a precise SAR of BEA and/or USY may thus improve coking within USY and within the HC trap 18. Additionally, providing a high SAR in BEA (SAR of more than 120) helps to ensure that BEA is utilized for trapping while the expensive transition metal is saved for the USY zeolite capable of iso-octane coking. Additionally, as was mentioned above, higher SAR results in a more stable and durable BEA structure.

Utilizing a precious metal as the active metal for coking over USY results in several advantages when compared to other active metals such as a transition metal like copper. For example, palladium is more efficient in coking than copper, and the generated coke requires relatively low temperatures and less oxygen to burn than coke generated using copper or other transition metals.

Figure 9:
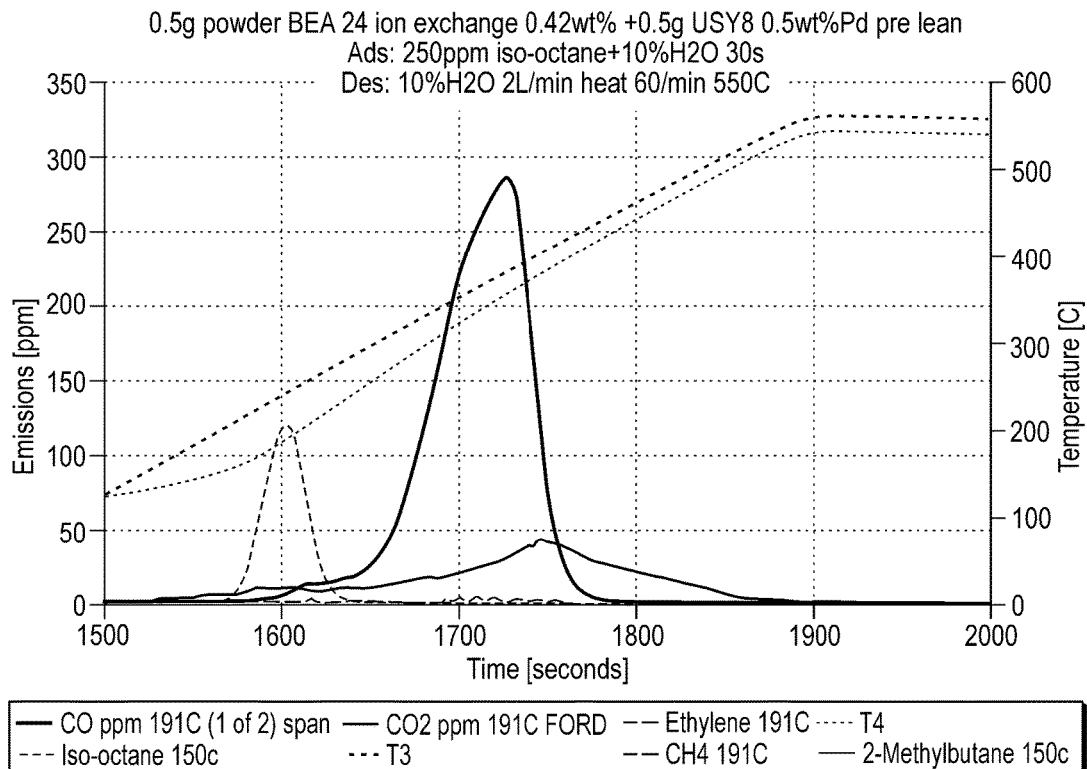
FIG. 9 shows a plot of iso-octane concentration versus time of iso-octane desorption at BEA24 with 0.5 wt. % Pd loading combined with USY8 with 0.5 wt. % loading with the initial iso-octane adsorption temperature of 30° C.

The results of BEA, USY zeolite combination can be seen in FIG. 9, which depicts a plot of iso-octane concentration versus time during iso-octane desorption at BEA24 with 0.5 wt. % Pd loading combined with USY8 with 0.5 wt. % Pd loading when the sample was heated up in 60° C./minute. The initial iso-octane adsorption temperature was 30° C. and about 50% of iso-octane was converted to CO and $CO_2$ using the combination of the BEA and USY zeolites. Additional efficiency improvement may be achieved by increasing the active metal loading of the BEA zeolite, USY zeolite, or both. Alternatively, the efficiency may be improved by increasing the iso-octane release temperature from the BEA zeolite. Iso-octane typically only has about 10% conversion efficiency. Thus, the achieved 50% represents a significant improvement which may improve overall vehicle cold start NMHC conversion by about 7% which represents a significant improvement.

Regarding the structure of the HC trap 18, FIGS. 10A-10D illustrate example embodiments. As can be seen, the HC trap 18 may include a substrate 22 having a plurality of apertures through which the exhaust gas may or may not pass. The substrate 22 may be a monolith or an extruded material. The trapping material 24 may be arranged adjacent to the substrate 22. The TWC 20, the substrate 22, and the trapping material 24 may form respective layers 26. The layers 26 may be adjacent to each other so that the exhaust gas 28 passes through the trapping material 24 designed to capture and hold certain species of HCs until the materials within the TWC 20 are capable of conversion. A channel 27 may be dividing the layers 26. The direction of the exhaust gas flow 28 through the channel 27 and the layers 26 is indicated in the figure with the arrows. The HC catalyst trap 18 may include a separate layer 26' containing BEA zeolite configured to adsorb iso-octane at ambient temperatures and desorb iso-octane at temperatures between about 150° C. and 170° C., as was described above. In such embodiment depicted in FIG. 10A, a second layer 26" may be included downstream from the layer 26', layer 26" including the active metal supercage impregnated USY zeolite configured to adsorb and coke iso-octane at temperatures greater than 150° C. The BEA zeolite layer 26" is disposed between the substrate 22 and the USY zeolite layer 26'. Alternatively, layer 26' may include the USY zeolite and the layer 26" may include the BEA zeolite. The TWC 20 may be the layer adjacent to the channel 27, to the layer 26', layer 26", or the substrate 22.

Figure 10A:
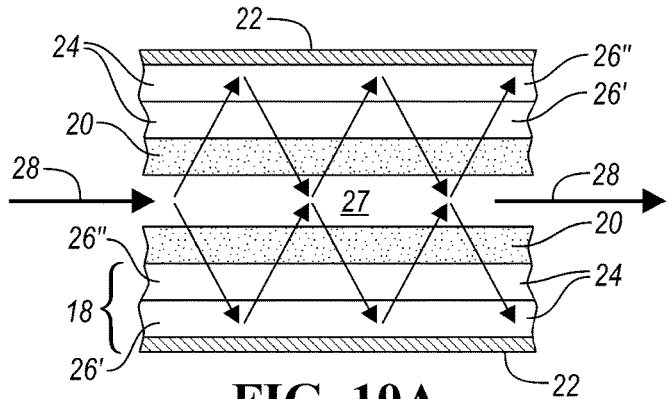
FIGS. 10A-10D depict example HC catalyst trap arrangements including one or more layers or portions of trapping material.
Figure 10B:
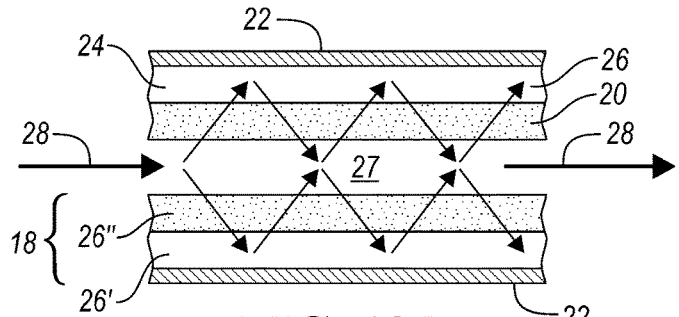

In one or more embodiments, illustrated in FIG. 10B, a single layer 26' may be arranged between the substrate 22 and the TWC 20. The single layer 26' may include a mixture of the BEA zeolite and the USY zeolite. The BEA and USY may be mixed homogenously or heterogeneously. Clusters, agglomerations, aggregations, or the like of USY, BEA, or both may be formed within the layer 26'.

Figure 10C:
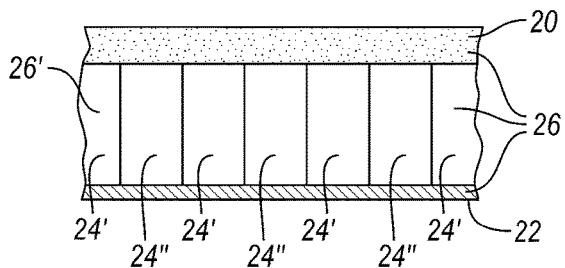
Figure 10D:
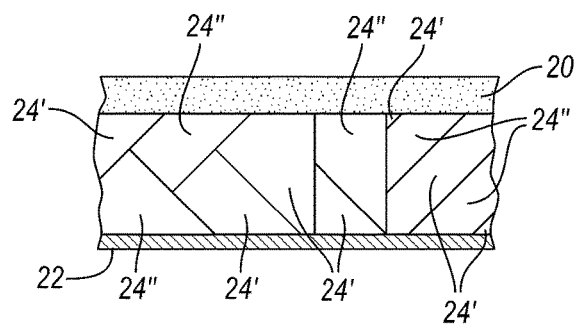

In yet another embodiment depicted in FIG. 10C, the layer 26' may include one or more portions of the trapping material 24' including the BEA zeolite and one or more portions of the trapping material 24" including the USY zeolite. The portions 24' and 24" may be arranged in a regular, irregular, symmetrical, or asymmetrical pattern. For example, as FIG. 10C shows, the portions 24' and 24" may be disposed adjacent to each other and alternate. Alternatively, the portions 24' and 24" may be arranged in a geometrical pattern such as a checkered pattern, abstract pattern, or regularly repeating pattern having a geometric grid upon which the pattern is constructed. More than one pattern may be realized within the layer 26, as FIG. 10D depicts. The portions 24' and 24" may be oriented perpendicularly to the TWC 20, the substrate 22, or both, as is shown in FIG. 10C. Alternatively, the orientation of the portions 24', 24", or both may be different so that the angle between the portions 24' and 24" and the TWC 20 and the substrate 22 is different than 90°.

The layers 26 may have the same or different dimensions and depend on the type and amount of fuel used by the engine and the volume of exhaust gas 28 to pass through the catalytic converter 16. The ratio of the BEA zeolite to the USY zeolite within the HC catalyst trap 18 and/or within one or more layers 26 may be in the range of about 1:4 to 4:1.

Figure 11A:
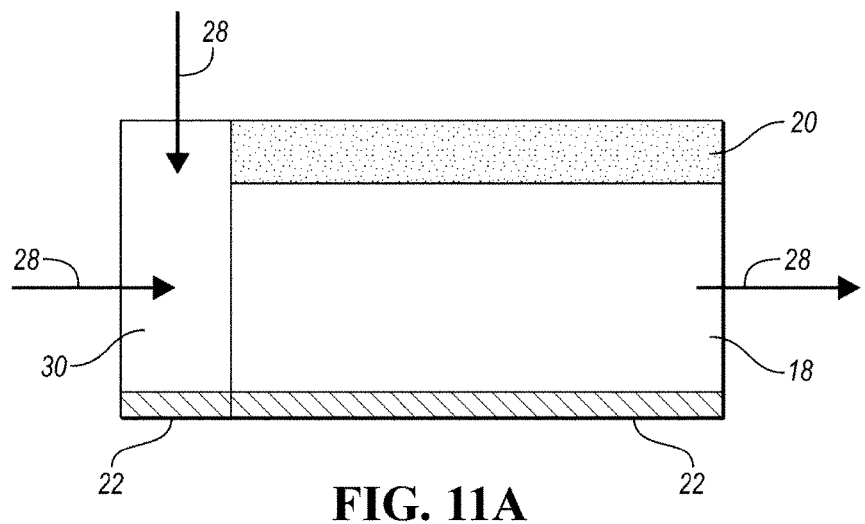
FIGS. 11A and 11B show example arrangements of two HC catalyst traps incorporated within the same catalytic converter.
Figure 11B:
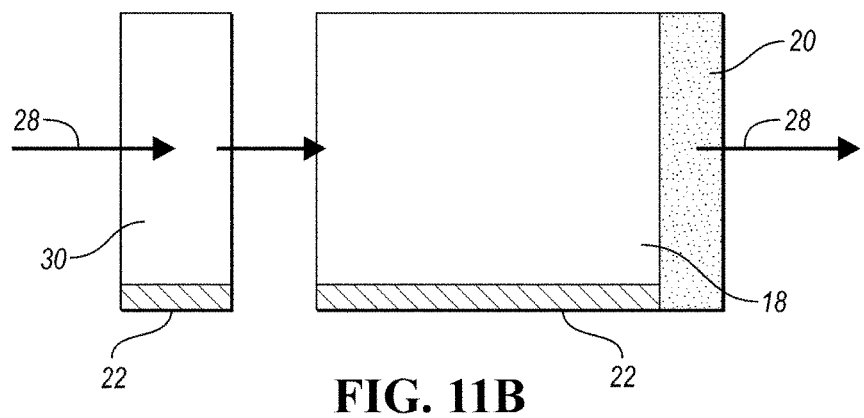

If toluene is present in the exhaust gas 28 being supplied to the catalytic converter 16, the converter's efficiency may be increased by including an additional HC catalytic trap 30 in addition to the first HC catalytic trap 18. Two embodiments incorporating two HC traps 18, 30 are depicted in FIGS. 11A and 11B. The second HC trap 30 may include modified zeolites, as described above, or zeolites unmodified with an active metal. For example, the zeolite included in the second HC trap 30 may be BEA modified with copper, but other types of naturally-occurring and synthetic zeolites and active metals are contemplated. The second HC trap 30 may be included upstream from the first HC trap 18. The benefit of including the second HC trap 30 lies in the fact that toluene competes with iso-octane. Thus, the active metal sites in the HC trap 18 may be occupied by toluene instead of iso-octane which may result in lower conversion efficiency of iso-octane. By including a HC trap 30 capable of capturing toluene at ambient temperatures so that iso-octane does not have competition in the HC trap 18 may provide better over-all conversion results. While the HC trap 30 may be modified with any active metal named above in an amount named above, utilization of a cheaper transition metal such as copper may be beneficial for economic reasons.

The HC trap 30 may be located adjacent to the HC trap 18, as can be seen in FIG. 11A. The HC trap 30 may be in contact with the HC trap 18, layers 26', 26", portions 24', 24", the TWC 20, or a combination thereof. Alternatively, the HC trap 30 may be spaced apart from the HC trap 18 so that the traps 18 and 30 are not in direct physical contact. Fluid contact between the traps 18 and 30 may exist. Physical separation between the HC traps 18 and 30 may be beneficial so that the active metal from the HC trap 30 does not interfere with the active metal of the HC trap 18. For example, copper incorporated in the HC trap 30 may migrate to the precious metal such as palladium attached in the HC trap 18. Because free copper tends to move and can attach itself to the precious metal such as palladium, copper could poison the precious metal and lower efficiency of the HC trap 18 if copper from the trap 30 had access to the trap 18. By including the trap 30 upstream of the trap 18, up to 100% of toluene may be captured such that no toluene enters the HC trap 18.

The TWC 20 may be a typical three-way catalyst for purification of the exhaust gas from the internal combustion engine. A TWC layer 20 may include active aluminum oxide and a mixture of cerium/zirconium oxide catalytically activated with an active metal to convert HCs and NOx. Because the USY layer within the HC catalyst trap 18 cokes iso-octane, the exhaust gas 28 entering the TWC 20, located downstream from the HC trap 18, carries CO, $CO_2$, $H_2O$, and a lesser amount of unconverted HCs than upon entry into the trap 18. Thus lower amount of transition metal is required for HC conversion in the TWC 20. Similarly, even lower amount of transition metal may be used in the TWC 20 if the HC trap 18 is combined with the HC trap 30 as up to 100% conversion of toluene is achieved prior to the exhaust gas 28 entry of the TWC 20. Typically, the TWC 20 would contain more than 20 $g/ft^3$ of the active metal. In the embodiments of the present disclosure; however, the amount of the active metal may be less than 20 $g/ft^3$, for example less than 20 $g/ft^3$ of palladium. This approach may help neutralize the cost of including an active metal in the HC trap 18, the HC trap 30, or both.

The present disclosure also includes a method of lowering the amount of NMHC emissions. The method includes preparing a HC catalyst trap 18 tailored to catalytically convert iso-octane to CO and $CO_2$. Preparing the HC catalyst trap 18 may include forming a substrate 22, TWC 20, and one or more layers of trapping material 26. The trapping material may be further prepared as one layer by mixing more than one type of zeolite tailored to adsorb and convert iso-octane. Alternatively, the method employs separate preparation of trapping material layers 26' and 26" or portions 24' and 24". Example layers 26 are described above and depicted in the FIGS. 10A-10D. The method further contemplates modifying the trapping material 24 with one or more active metals by utilizing ion-exchange. The method may include selectively designing the SAR of the BEA and USY zeolites to achieve a desired amount of ion-exchange sites within the different types of zeolite to encourage the one or more active metals to attach to a certain type of zeolite. For example, the method may include incorporating BEA and USY zeolite, BEA having a SAR greater than 250 such that the BEA zeolite is less active than the USY zeolite and the active metal tends to attach to the USY zeolite.

The process utilizes the HC trap 18 described above to capture, release, re-capture, coke, and again release iso-octane such that higher percentage of iso-octane is converted than in a system not including the HC trap 18 having two types of zeolite tailored for iso-octane capture and conversion. The method includes providing exhaust gas 28 including iso-octane to the HC trap 18, adsorbing iso-octane by an active metal modified BEA zeolite at ambient temperatures, holding iso-octane in BEA supercage until the temperature of the system reaches about 150° C. to 170° C. The method further includes releasing iso-octane from the modified BEA zeolite and adsorbing iso-octane by the modified USY zeolite, trapping, coking, converting iso-octane in the USY zeolite, and releasing unconverted iso-octane and products of the iso-octane coking from USY zeolite at temperatures higher than about 150° C. The method achieves up to 50% iso-octane conversion. The method further includes converting iso-octane and other HC and NOx species in the TWC 20 and releasing conversion products from the TWC 20.

The method may include forming an additional HC catalytic trap 30 designed to adsorb, release, and/or convert up to 100% toluene present in the exhaust gas 28. The method may include combining HC traps 18 and 30 in one system, placing the HC trap 18 downstream from the HC trap 30.

The method may include assembling a catalytic converter including a substrate 22, the HC trap 18, the HC trap 30, the TWC 20, or a combination thereof. An example catalytic converted is described above and depicted in FIG. 2.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A catalytic converter comprising:
    a hydrocarbon catalyst trap including a trapping material disposed between a three-way catalyst and a substrate, the trapping material including:
        BEA zeolite that absorbs iso-octane at ambient temperatures and desorbs iso-octane at temperatures between 150° C. and 170° C., and
        metal supercage impregnated USY zeolite that absorbs iso-octane and cokes iso-octane at temperatures greater than 150° C.

2. The catalytic converter of claim 1, wherein the metal is palladium.

3. The catalytic converter of claim 1, wherein the BEA zeolite and the metal supercage impregnated USY zeolite form respective adjacent layers.

4. The catalytic converter of claim 3, wherein the BEA zeolite is disposed between a three-way catalyst and the metal supercage impregnated USY zeolite.

5. The catalytic converter of claim 3, wherein the metal supercage impregnated USY zeolite is disposed between a three-way catalyst and the BEA zeolite.

6. The catalytic converter of claim 1, wherein the BEA zeolite and the metal supercage impregnated USY zeolite form a single-layer mixture.

7. The catalytic converter of claim 1, wherein a ratio of the BEA zeolite to the metal supercage impregnated USY zeolite is in a range of 1:4 to 4:1.

8. The catalytic converter of claim 1, wherein a ratio of silica to alumina of the BEA zeolite is 15 to at least 250.

9. The catalytic converter of claim 1, wherein at least a portion of the BEA zeolite is palladium supercage impregnated BEA zeolite or copper supercage impregnated BEA zeolite.

10. A catalytic trap comprising:
    BEA zeolite that absorbs iso-octane at ambient temperatures and desorbs iso-octane at temperatures between 150° C. and 170° C.;
    precious metal supercage impregnated USY zeolite in contact with the BEA zeolite, and that absorbs iso-octane and cokes iso-octane at temperatures greater than 150° C.; and
    transition metal supercage impregnated BEA zeolite disposed upstream of the BEA zeolite and that absorbs toluene at ambient temperatures.

11. The trap of claim 10, wherein the precious metal is palladium.

12. The trap of claim 10, wherein the transition metal is copper.

13. The trap of claim 10, wherein the BEA zeolite, the precious metal supercage impregnated USY zeolite, and the transition metal supercage impregnated BEA zeolite form respective adjacent layers.

14. The trap of claim 13, wherein the transition metal supercage impregnated BEA zeolite forms a layer oriented perpendicular to the BEA zeolite and precious metal supercage impregnated USY zeolite layers.

15. A hydrocarbon and NOx catalyst trap comprising:
    a three-way catalyst including less than 20 g/ft$^3$ of palladium;
    BEA zeolite that absorbs iso-octane at ambient temperatures and desorbs iso-octane at temperatures between 150° C. and 170° C.;
    precious metal supercage impregnated USY zeolite in contact with the BEA zeolite, and that absorbs iso-octane and cokes iso-octane at temperatures greater than 150° C.; and
    transition metal supercage impregnated BEA zeolite disposed upstream of the BEA zeolite and configured to adsorb toluene at ambient temperatures.

16. The trap of claim 15, wherein the precious metal is palladium.

17. The trap of claim 15, wherein the transition metal is copper.

18. The trap of claim 15, wherein a ratio of the BEA zeolite to the precious metal supercage impregnated USY zeolite is in a range of 1:4 to 4:1.

* * * * *